United States Patent
Lin

(10) Patent No.: US 9,225,906 B2
(45) Date of Patent: Dec. 29, 2015

(54) ELECTRONIC DEVICE HAVING EFFICIENT MECHANISMS FOR SELF-PORTRAIT IMAGE CAPTURING AND METHOD FOR CONTROLLING THE SAME

(71) Applicant: Chiun Mai Communication Systems, Inc., New Taipei (TW)

(72) Inventor: Chien-Yu Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/161,668

(22) Filed: Jan. 22, 2014

(65) Prior Publication Data

US 2015/0015724 A1  Jan. 15, 2015

(30) Foreign Application Priority Data

Jul. 15, 2013 (TW) .............................. 102125161 A

(51) Int. Cl.
*H04N 5/232* (2006.01)
*H04N 5/225* (2006.01)
*H04N 5/222* (2006.01)

(52) U.S. Cl.
CPC ........... *H04N 5/23293* (2013.01); *H04N 5/232* (2013.01); *H04N 5/23219* (2013.01); *H04N 5/2251* (2013.01)

(58) Field of Classification Search
None
See application file for complete search history.

(56) References Cited

U.S. PATENT DOCUMENTS

| | | | |
|---|---|---|---|
| 8,340,456 B1* | 12/2012 | DaneshPanah et al. | 382/255 |
| 2010/0033599 A1* | 2/2010 | Guan | 348/231.99 |
| 2011/0007951 A1* | 1/2011 | Mil'shtein et al. | 382/124 |
| 2011/0019058 A1* | 1/2011 | Sakai et al. | 348/333.01 |
| 2011/0216209 A1* | 9/2011 | Fredlund et al. | 348/211.99 |
| 2012/0076369 A1* | 3/2012 | Abramovich et al. | 382/124 |
| 2012/0105588 A1* | 5/2012 | Yamamoto | 348/46 |
| 2012/0226979 A1* | 9/2012 | Harberts et al. | 715/702 |
| 2012/0229660 A1* | 9/2012 | Matthews et al. | 348/207.11 |
| 2013/0057713 A1* | 3/2013 | Khawand | 348/208.1 |
| 2014/0225821 A1* | 8/2014 | Kim et al. | 345/156 |

FOREIGN PATENT DOCUMENTS

| | | |
|---|---|---|
| JP | 11212726 A | 8/1999 |
| JP | 11289484 A | 10/1999 |
| JP | 2002354311 A | 12/2002 |
| JP | 2006301201 A | 11/2006 |
| JP | 201345125 A | 3/2013 |

* cited by examiner

*Primary Examiner* — Shahbaz Nazrul
(74) *Attorney, Agent, or Firm* — Novak Druce Connolly Bove + Quigg LLP

(57) ABSTRACT

An electronic device includes a camera device for capturing images and a fingerprint identification unit for receiving signals of fingerprints. The electronic device detects a signal received from the fingerprint identification unit, and controls the camera device to focus a specified scene of the camera device and capturing an image of the specified scene, when the detected signal is a press signal.

12 Claims, 3 Drawing Sheets

ELECTRONIC DEVICE HAVING EFFICIENT MECHANISMS FOR SELF-PORTRAIT IMAGE CAPTURING AND METHOD FOR CONTROLLING THE SAME

BACKGROUND

1. Technical Field

Embodiments of the present disclosure relate to an image capturing technology, and particularly to an electronic device having efficient mechanisms for self-portrait image capturing and a method for controlling the same using the electronic device.

2. Description of Related Art

Most people like to use digital cameras or smart phones to capture self-portraits of themselves. However, if a user uses the smart phone to capture a self-portrait, a finger needs be used to click a button (or a virtual button) for capturing photos, or to slide a button (or a virtual button) for adjusting focus of the photos. Such clicking or sliding operations when capturing the images may cause the image to be inaccurate or unsteadily. If the user uses the digital camera to capture a self-portrait, the user needs to face to camera lens of the digital camera and cannot see the image on a display screen. The user cannot capture or adjust the image appropriately and conveniently without an observation of the image displayed on the display screen. Therefore, clear and appropriate self-portraits cannot be captured or be adjusted conveniently and efficiently using the digital cameras or smart phones.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable media or storage medium. Some non-limiting examples of a non-transitory computer-readable medium include CDs, DVDs, flash memory, and hard disk drives.

Figure 1:
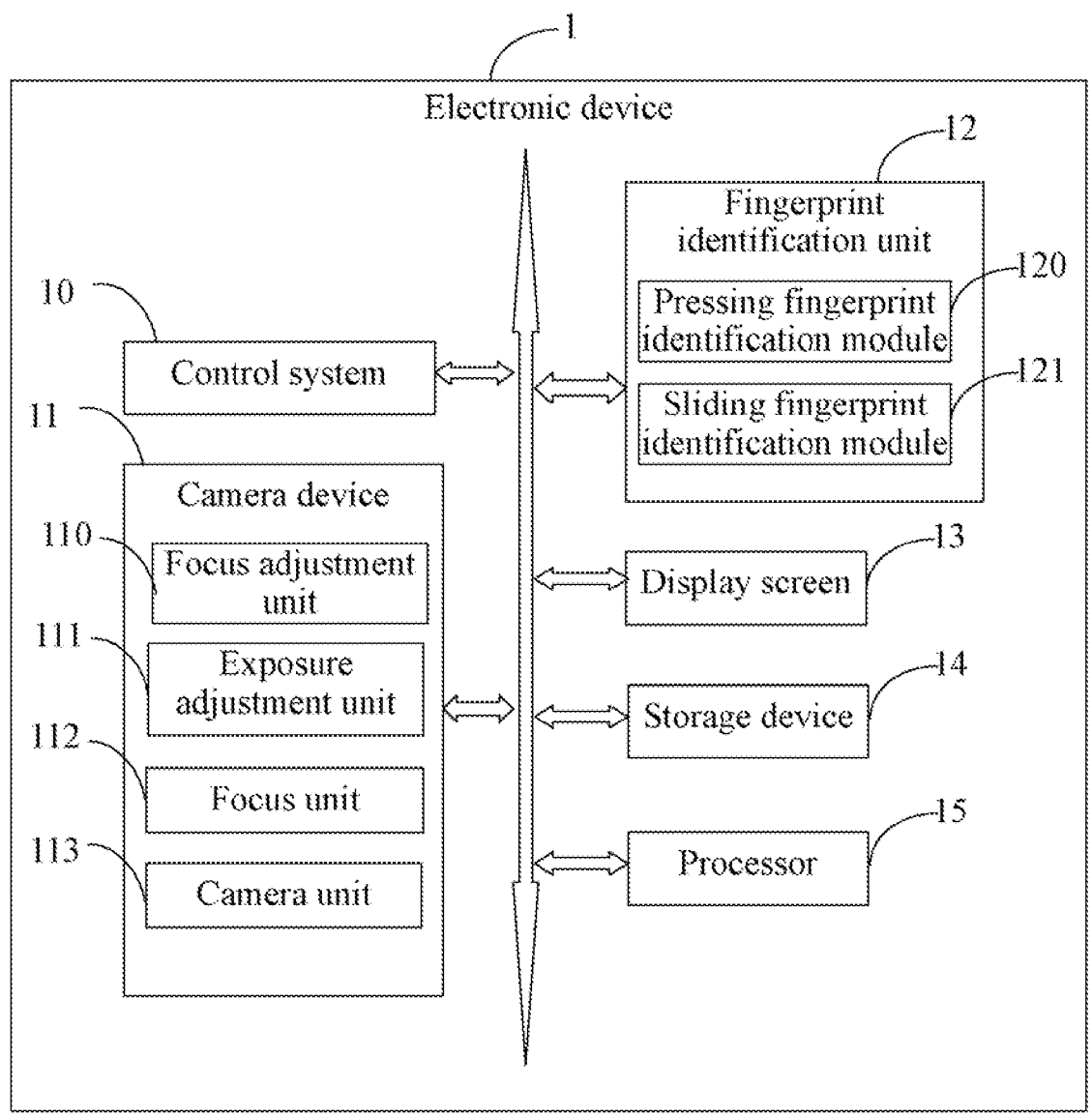
FIG. 1 is a block diagram of one embodiment of an electronic device including a control system.

FIG. 1 is a block diagram of one embodiment of an electronic device 1 including a control system 10. The electronic device 1 may be a smart phone, a notebook computer, a digital camera or any other electronic devices. The electronic device 1 includes a camera device 11, a fingerprint identification unit 12, a display screen 13, a storage device 14 and at least one processor 15. The electronic device 1 uses the camera device 11 to capture images of specified scene, and displays the captured images on the display screen 13.

In one embodiment, the camera device 11 includes a focus adjustment unit 110, an exposure adjustment unit 111, a focusing unit 112, and a camera unit 113. The focus adjustment unit 110 may adjust focus length of the camera device 11 according to a first predefined value (e.g. 5 millimeters). The exposure adjustment unit 111 may adjust exposure value (EV) of the camera device 11 according to a second predefined value (e.g. 1 EV). The focusing unit 112 may focus the specified scene to make the specified scene clearer automatically. In some embodiments, the focusing unit 112 may be a sensor system or an autofocus system of the electronic device 1. The camera device 11 uses the camera unit 113 to capture the image of any scene, for example, to capture images of self-portraits of users.

The fingerprint identification unit 12 includes a pressing fingerprint identification module 120 that identifies a press signal of a fingerprint, and a sliding fingerprint identification module 121 that identifies up, down, left or right sliding signals of fingerprints. In one embodiment, in order to capture self-portraits more conveniently, the pressing fingerprint identification module 120 may be located at an area at a back of the electronic device 1, and the sliding fingerprint identification module 121 may be located at an area on one side of the electronic device 1. In one embodiment, the control system 10 adjusts and controls the camera device 1 to capture self-portraits of users according to the fingerprint identification unit 12 conveniently.

The display screen 13 may output visible data, such as preview scenes to be captured, or images of the electronic device 1, for example. The storage system 14 may store various data, such as the captured images of the electronic device 1. The storage system 14 may be a memory system of the electronic device 1, and may be an external storage card, such as a smart media (SM) card, or secure digital (SD) card, for example. The at least one processor 15 executes one or more computerized code of the electronic device 1 and other applications, to provide the functions of the electronic device 1.

Figure 2:
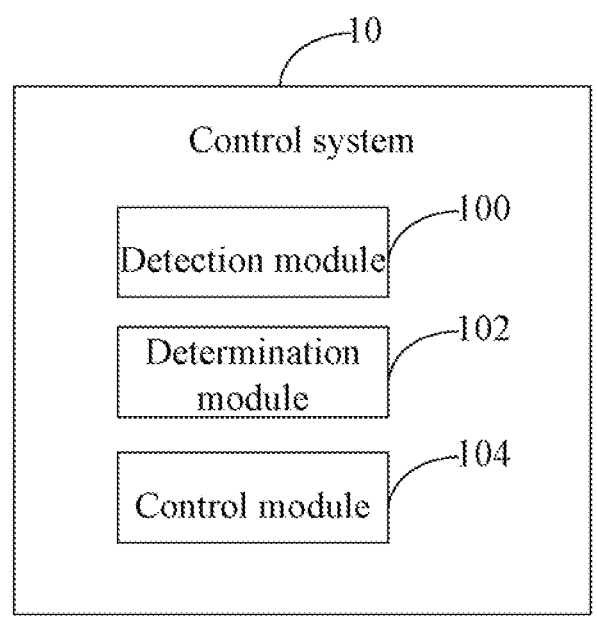
FIG. 2 is a block diagram of one embodiment of function modules of the control system included in the electronic device of FIG. 1.

FIG. 2 is a block diagram illustrating function modules of the control system 10 in the electronic device 1 of FIG. 1. In the embodiment, the control system 10 includes a detection module 100, a determination module 102, and a control module 104. The modules 100, 102, and 104 may comprise computerized instructions in the form of one or more computer-readable programs that are executed by the processor 15. A description of each module is given in the following paragraphs.

Figure 3:
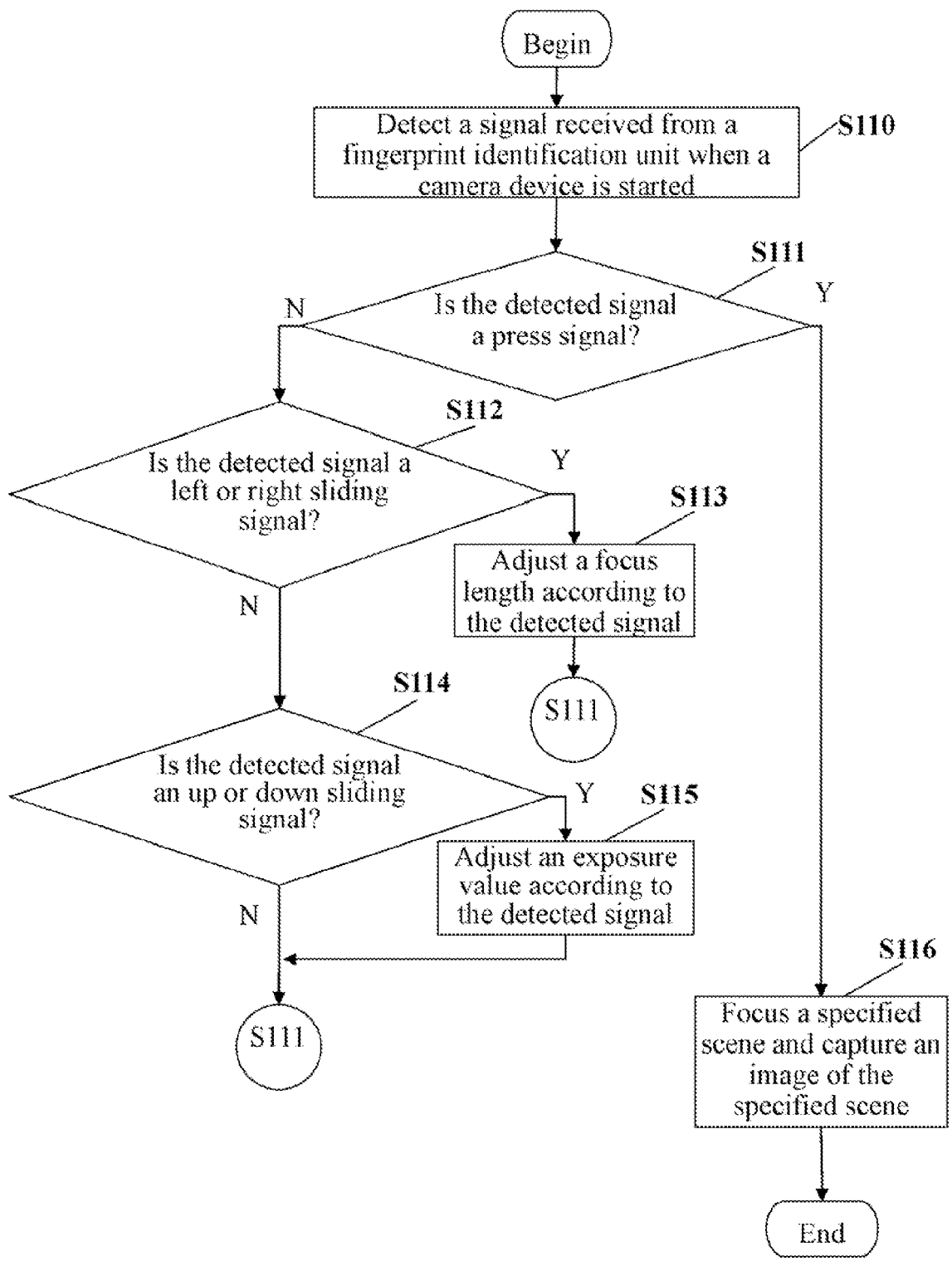
FIG. 3 is a flowchart of one embodiment of a method for controlling image capturing in the electronic device of FIG. 1.

FIG. 3 is a flowchart of one embodiment of a method for controlling image capturing in the electronic device 1 of FIG. 1. Depending on the embodiment, additional steps may be added, others removed, and the ordering of the steps may be changed.

In step S110, the detection module 100 detects a signal received from the fingerprint identification unit 12, when the camera device 11 is started.

In step S111, the determination module 102 determines whether the detected signal is a press signal. If the detected signal is determined to be the press signal, step S116 is implemented. If the detected signal is not the press signal, step S112 is implemented.

In step S112, the determination module 102 determines whether the detected signal is a left or right sliding signal. If the detected signal is determined to be the left or right sliding signal, step S113 is implemented. If the detected signal is not the left or right sliding signal, step S114 is implemented.

In step S113, the control module 104 controls the focus adjustment unit 110 of the camera device 11 to adjust a focus length according to the detected signal. In one embodiment, when the detected signal is the left sliding signal, the control module 104 controls the focus adjustment unit 110 to increase the focus length according to a first predefined value (e.g. 5 millimeters). When the detected signal is the right sliding signal, the control module 104 controls the focus adjustment unit 110 to decrease the focus length according to the first predefined value.

In step S114, the determination module 102 determines whether the detected signal is an up or down sliding signal. If the detected signal is determined to be the up or down sliding signal, step S115 is implemented. If the detected signal is not the up or down sliding signal, step S111 is implemented.

In step S115, the control module 104 controls the exposure adjustment unit 111 of the camera device 11 to adjust an exposure value according to the detected signal. In one embodiment, when the detected signal is the up sliding signal, the control module 104 controls the exposure adjustment unit 111 to increase the exposure value according to a second predefined value. When the detected signal is the down sliding signal, the control module 104 controls the exposure adjustment unit 111 to decrease the exposure value according to the second predefined value.

In step S116, the control module 104 controls the focusing unit 112 of the camera device 11 to focus a specified scene and controls the camera unit 113 of the camera device 11 to capture an image of the specified scene.

All of the processes described above may be embodied in, and fully automated via, functional code modules executed by one or more general purpose processors such as the processor 15. The code modules may be stored in any type of non-transitory readable medium or other storage device such as the storage system 14. Some or all of the methods may alternatively be embodied in specialized hardware. Depending on the embodiment, the non-transitory readable medium may be a hard disk drive, a compact disc, a digital versatile disc, a tape drive, or other suitable storage medium.

The described embodiments are merely examples of implementations, and have been set forth for a clear understanding of the principles of the present disclosure. Variations and modifications may be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. An electronic device, comprising:
a camera device;
a fingerprint identification unit, the fingerprint identification unit comprising a pressing fingerprint identification module that identifies a press signal of a fingerprint and a sliding fingerprint identification module that identifies up, down, left or right sliding signals of the fingerprints;
at least one processor; and
a storage device storing one or more programs, when executed by the at least one processor, cause the at least one processor to perform operations of:
detecting a signal received from the fingerprint identification unit;
controlling the camera device to focus a specified scene and capturing an image of the specified scene, when the detected signal is the press signal of the fingerprint;
controlling the camera device to adjust a focus length according to the detected signal, when the detected signal is one of the left and right sliding signal; and
controlling the camera device to adjust an exposure value according to the detected signal, when the detected signal is one of the up and down sliding signal.

2. The electronic device according to claim 1, wherein the focus length is increased according to a first predefined value when the detected signal is the left sliding signal, or is decreased according to the first predefined value when the detected signal is the right sliding signal.

3. The electronic device according to claim 1, wherein the exposure value is increased according to a second predefined value when the detected signal is the up sliding signal, or is decreased according to the second predefined value when the detected signal is the down sliding signal.

4. The electronic device according to claim 1, wherein the pressing fingerprint identification module is located at an area at a back of the electronic device, and the sliding fingerprint identification module is located an area on one side of the electronic device.

5. A method for controlling self-portrait images capturing in an electronic device, the electronic device comprising a camera device and a fingerprint identification unit, the fingerprint identification unit comprising a pressing fingerprint identification module that identifies a press signal of a fingerprint and a sliding fingerprint identification module that identifies up, down, left or right sliding signals of the fingerprints, the method comprising:
detecting a signal received from the fingerprint identification unit;
controlling the camera device to focus a specified scene and capturing an image of the specified scene, when the detected signal is the press signal of the fingerprint;
controlling the camera device to adjust a focus length according to the detected signal, when the detected signal is one of the left and right sliding signal; and
controlling the camera device to adjust an exposure value according to the detected signal, when the detected signal is one of the up and down sliding signal.

6. The method according to claim 5, wherein the focus length is increased according to a first predefined value when the detected signal is the left sliding signal, and is decreased according to the first predefined value when the detected signal is the right sliding signal.

7. The method according to claim 5, wherein the exposure value is increased according to a second predefined value when the detected signal is the up sliding signal, and is decreased according to the second predefined value when the detected signal is the down sliding signal.

8. The method according to claim 5, wherein the pressing fingerprint identification module is located at an area at a back of the electronic device, and the sliding fingerprint identification module is located at an area on one side of the electronic device.

9. A non-transitory storage medium having stored thereon instructions that, when executed by at least one processor of an electronic device, cause the processor to perform a method for controlling self-portrait image capturing in the electronic device, the electronic device comprising a camera device and a fingerprint identification unit, the fingerprint identification unit comprising a pressing fingerprint identification module that identifies a press signal of a fingerprint and a sliding fingerprint identification module that identifies up, down, left or right sliding signals of the fingerprints, the method comprising:

detecting a signal received from the fingerprint identification unit;

controlling the camera device to focus a specified scene and capturing an image of the specified scene, when the detected signal is the press signal of the fingerprint;

controlling the camera device to adjust a focus length according to the detected signal, when the detected signal is one of the left and right sliding signal; and controlling the camera device to adjust an exposure value according to the detected signal, when the detected signal is one of the up and down sliding signal.

10. The storage medium according to claim 9, wherein the focus length is increased according to a first predefined value when the detected signal is the left sliding signal, and is decreased according to the first predefined value when the detected signal is the right sliding signal.

11. The storage medium according to claim 9, wherein the exposure value is increased according to a second predefined value when the detected signal is the up sliding signal, and is decreased according to the second predefined value when the detected signal is the down sliding signal.

12. The storage medium according to claim 9, wherein the pressing fingerprint identification module is located at an area at a back of the electronic device, and the sliding fingerprint identification module is located an area on one side of the electronic device.

* * * * *